US009462879B2

(12) United States Patent
Anelevitz

(10) Patent No.: US 9,462,879 B2
(45) Date of Patent: Oct. 11, 2016

(54) TOOTHBRUSH HOLDER

(71) Applicant: Nolan Anelevitz, Toronto (CA)

(72) Inventor: Nolan Anelevitz, Toronto (CA)

( * ) Notice: Subject to any disclaimer, the term of this patent is extended or adjusted under 35 U.S.C. 154(b) by 0 days.

(21) Appl. No.: 14/961,269

(22) Filed: Dec. 7, 2015

(65) Prior Publication Data
US 2016/0157598 A1    Jun. 9, 2016

Related U.S. Application Data

(60) Provisional application No. 62/089,468, filed on Dec. 9, 2014.

(51) Int. Cl.
| G04B 47/00 | (2006.01) |
| A46B 15/00 | (2006.01) |
| A47K 1/09 | (2006.01) |
| G09B 19/00 | (2006.01) |

(52) U.S. Cl.
CPC ....... *A46B 15/0008* (2013.01); *A46B 15/0048* (2013.01); *A47K 1/09* (2013.01); *G04B 47/00* (2013.01); *G09B 19/0084* (2013.01)

(58) Field of Classification Search
CPC .......... A46B 15/0004; A46B 15/0008; A46B 15/0038; A46B 15/0048; A47K 1/09; G09B 19/0084; G04B 47/00
See application file for complete search history.

(56) References Cited

U.S. PATENT DOCUMENTS

| 4,285,151 A * | 8/1981 | Gertler | G09B 19/0084 40/455 |
| 5,127,521 A * | 7/1992 | Bourque | A61L 2/10 206/15.2 |
| 5,184,959 A * | 2/1993 | Oryhon | A46B 15/0002 132/308 |
| 5,570,325 A * | 10/1996 | Arpadi | A46B 15/0002 222/192 |
| 5,864,288 A * | 1/1999 | Hogan | A46B 15/0002 340/332 |
| 6,371,420 B1 * | 4/2002 | Strunk | A46B 15/0002 15/105 |
| 6,565,819 B1 * | 5/2003 | Herrera | A46B 17/06 422/26 |
| 7,049,790 B2 * | 5/2006 | Pfenniger | A61C 17/224 320/114 |
| 7,097,050 B1 * | 8/2006 | McClellan | A47K 1/09 211/65 |
| 2004/0025899 A1 * | 2/2004 | Pinsky | A61L 2/10 132/310 |
| 2007/0144925 A1 * | 6/2007 | King | A47K 1/09 206/362.3 |
| 2009/0262606 A1 * | 10/2009 | Trost | A46B 15/0002 368/10 |
| 2011/0174823 A1 * | 7/2011 | Silva | A47K 1/09 220/476 |
| 2014/0096331 A1 * | 4/2014 | Farrell | A46B 7/04 15/22.1 |

* cited by examiner

*Primary Examiner* — Vit W Miska
(74) *Attorney, Agent, or Firm* — Philip C. Mendes da Costa; Bereskin & Parr LLP/S.E.N.C.R.L., s.r.l.

(57) ABSTRACT

A toothbrush holder comprises a main body having a toothbrush removal sensor positioned to detect removal of the toothbrush from the toothbrush holder and issuing a removal signal in response to the removal of the toothbrush. A timer initiates a time count when the removal signal is issued by the toothbrush removal sensor. A display is provided on the main body and displays an indicia of the time count upon the commencement of the time count. The toothbrush holder further comprises a top section having at least one aperture that removably receives a toothbrush handle. The top section is removably mounted to the main body. The toothbrush holder further comprises a bottom section comprising a drip tray removably mounted to the main body.

9 Claims, 4 Drawing Sheets

TOOTHBRUSH HOLDER

CROSS REFERENCE TO RELATED APPLICATIONS

This application claim the benefit of the filing date of U.S. Provisional Application Ser. No. 62/089,468 filed on Dec. 9, 2014, the entire disclosure of which is hereby incorporated by reference for all purposes in the present disclosure.

FIELD

The disclosure relates to toothbrush holders. More specifically, the disclosure relates to multipart toothbrush holders that include a timer for measuring the duration of tooth brushing.

BACKGROUND

PCT International Publication Number WO 2007/068984 (Palmer et al.) purports to disclose a tooth brushing timer device for guiding a person, particularly a child, while they brush their teeth. The tooth brushing timer device comprises an electronic timer adapted to count a predetermined time frame appropriate for the duration of brushing and which is initiated by a manually operable switch. There is also provided a visual display showing the time elapsed or the time remaining and which may also include instructions as to the brushing process. The tooth brushing timer device also includes a voice module and an audio output adapted to generate at predetermined time intervals spoken instructions to a person brushing their teeth. Furthermore, the tooth brushing timer device is encased in a housing which may be integral to a toothbrush or a stand-alone unit possibly taking the form of a cartoon character or animal.

SUMMARY

The following summary is intended to introduce the reader to various aspects of the applicant's teaching, but not to define any invention.

In accordance with one aspect of this specification, a multipart toothbrush holder is provided. The toothbrush holder comprises multiple parts such as a top section, a bottom section and a main body. The top section includes one or more slots, e.g., 3, 4 or 5 slots, each of which may be sized to removably receive one or more toothbrushes and, preferably, one toothbrush. The bottom section may comprise a drip tray. The top and bottom sections may be removably mounted to the main body.

A user may not dry a toothbrush before returning it to the toothbrush holder. Accordingly, water may drip down the toothbrush and accumulate in the toothbrush holder. By providing a removable bottom section, an emptyable drip tray is provided. Accordingly, a user may remove the bottom section, drain and clean the drip tray. The user may then mount the bottom section to the main body. Similarly, the upper section may require cleaning due to water and other material travelling down the toothbrush and contacting the upper section.

An advantage of this design is that the electronics may be provided with the main body. Accordingly, the upper and lower section need not have any electronics therein and may be removable for cleaning, such as by being paced in a dishwaher, immersed in water in a sink or the like without concern that the electronics may be exposed to water.

It will be appreciated that the electronics may be in an openable compartment. The compartment may be designed to be water tight or water resistant. For example, an openable door and a gasket may be provided. When the door is closed, the gasket may create a water tight seal. However, even with such a design, the main body may not be suitable for being placed in a dishwasher. Accordingly, the upper and lower section, which require the most cleaning may be individually removed and cleaned.

In accordance with this aspect, there is provided a toothbrush holder comprises a main body having a toothbrush removal sensor positioned to detect removal of the toothbrush from the toothbrush holder and issuing a removal signal in response to the removal of the toothbrush. A timer initiates a time count when the removal signal is issued by the toothbrush removal sensor. A display is provided on the main body and displays an indicia of the time count upon the commencement of the time count. The toothbrush holder further comprises a top section having at least one aperture that removably receives a toothbrush handle. The top section is removably mounted to the main body. The toothbrush holder further comprises a bottom section comprising a drip tray removably mounted to the main body.

In some examples, the indicia may comprise a time readout.

In some examples, the indicia may comprise a countdown time readout.

In some examples, the timer may be provided with a plurality of preset times and the indicia may comprise a plurality of icons. An illumination level of at least one of the icons may be changed when the time count reaches each of the preset times.

In some examples, the timer is provided with at least four different preset times and the indicia comprises an image of a mouth having four quadrants. A level of illumination of one of the four quadrants may be changed when the time count reaches each of the preset times.

In some examples, an audio signal may be issued at each of the preset times.

In some examples, the timer may be provided with a plurality of preset times and an audio signal may be issued at each of the preset times.

In some examples, the sensor may comprise a mechanical switch.

In some examples, the sensor may comprise at least one of a pressure sensor, a motion sensor, a reed switch and an RFID sensor.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1:
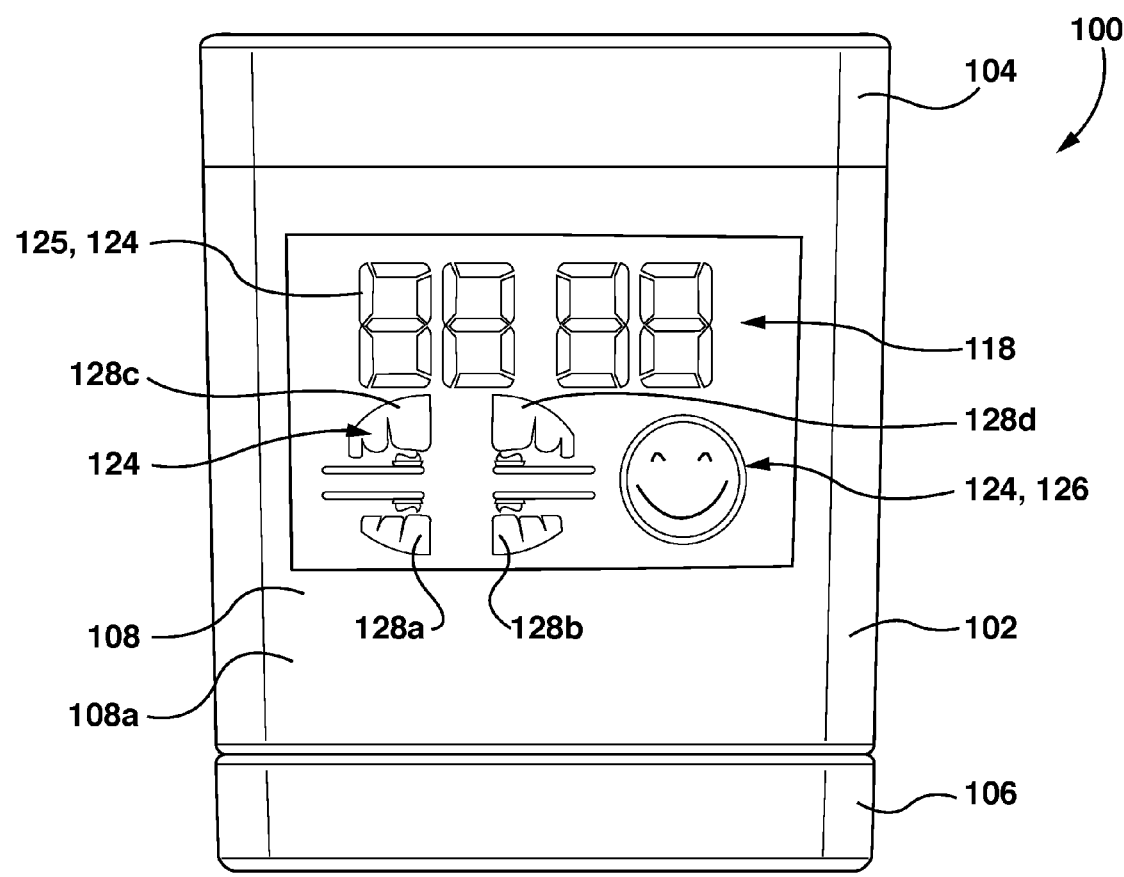
FIG. 1 is a front plan view of an example toothbrush holder.
Figure 2:
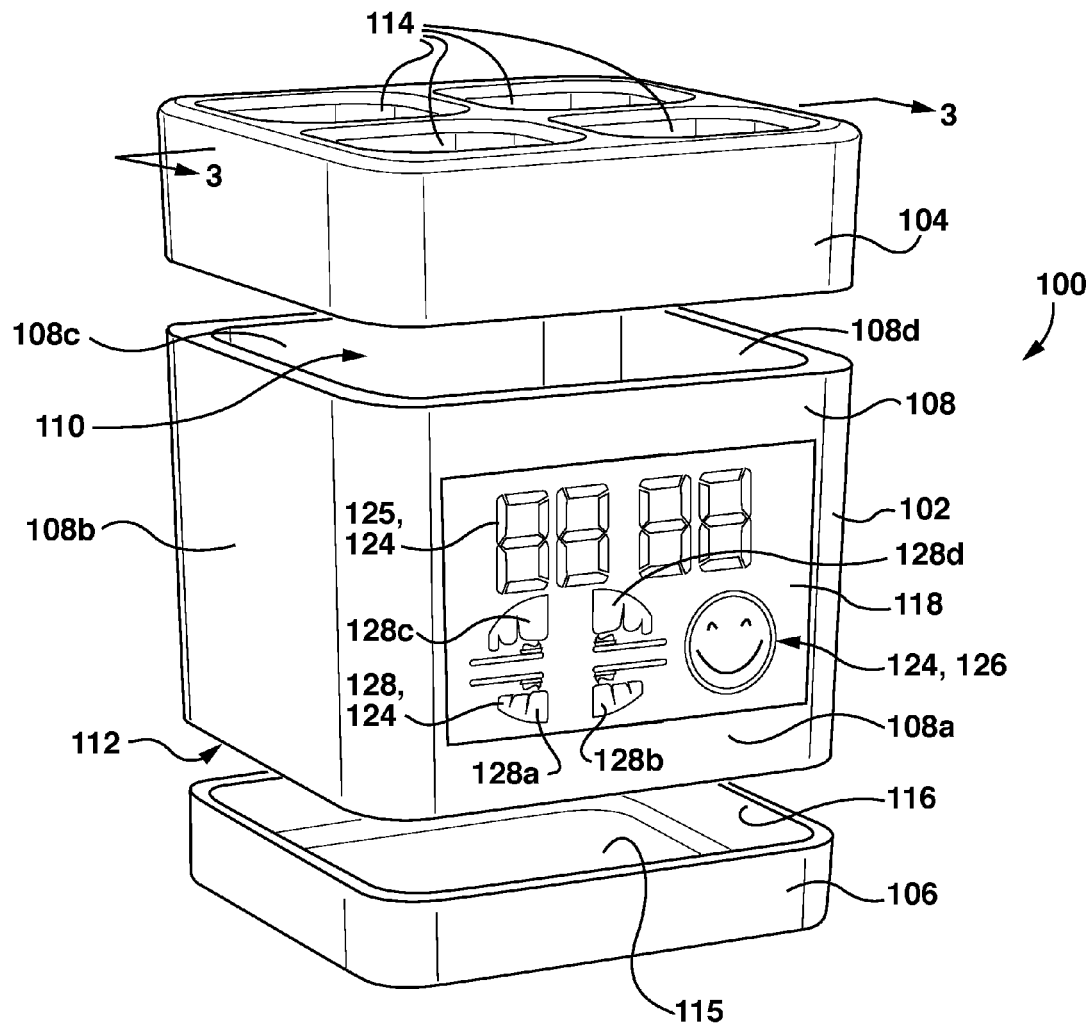
FIG. 2 is an exploded perspective view of the toothbrush holder of FIG. 1.

Referring to FIGS. 1 and 2, an example toothbrush holder 100 is shown. The toothbrush holder 100 (also referred to as holder 100) can be used for holding one or more toothbrushes (not shown), for example by inserting the handle (not shown) of the toothbrush downwardly into the toothbrush holder 100.

Referring still to FIGS. 1 and 2, in the example shown, the toothbrush holder includes a main body 102, a top section 104, and a bottom section 106.

In the example shown, the main body 102 includes a sidewall 108. The main body 102 is generally square in transverse section, and the sidewall 108 includes four sidewall portions 108a to 108d. The main body 102 has an open top 110 and an open bottom 112.

In the example shown, the top section 104 is removably mounted to the main body 102, and generally covers the open top 110 of the main body 102. The top section 104 may have at least one aperture therethrough, which removably receives a toothbrush handle. In the example shown, the top section 104 includes four apertures 114 therethrough, for receiving four toothbrushes. However, in alternate examples, the top section 104 may include another number of apertures, such as only one aperture, or two apertures.

In the example shown, the bottom section 106 is removably mounted to the main body 102, and generally covers the open bottom 112 of the main body 102. The bottom section 106 includes an interior bottom surface 115 that is bounded by an interior side wall 116. The interior bottom surface 115 and interior side wall 116 form a drip tray for the toothbrush holder 100. The bottom section 106 can be removed from the main body 102 for cleaning of the drip tray.

The top section 104 and bottom section 106 may be removably mounted to the main body 102 in a number of ways. In some examples, the main body 102 and the top section 104 and/or bottom section 106 may be configured to be mounted together by a friction fit. In other examples, the main body 102 and the top section 104 and/or bottom section 106 may be configured to be mounted together by a snap-fit. In other examples, the main body 102 and the top section 104 and/or bottom section 106 may be configured to be screwed together. In other examples, the top section 102 and/or bottom section 104 may be mounted to the main body 102 in other ways.

The main body 102, top section 104, and bottom section 106 may in some examples be made from molded plastic. In other examples, the main body 102, top section 104, and bottom section 106 may be made from metal or wood.

Figure 3:
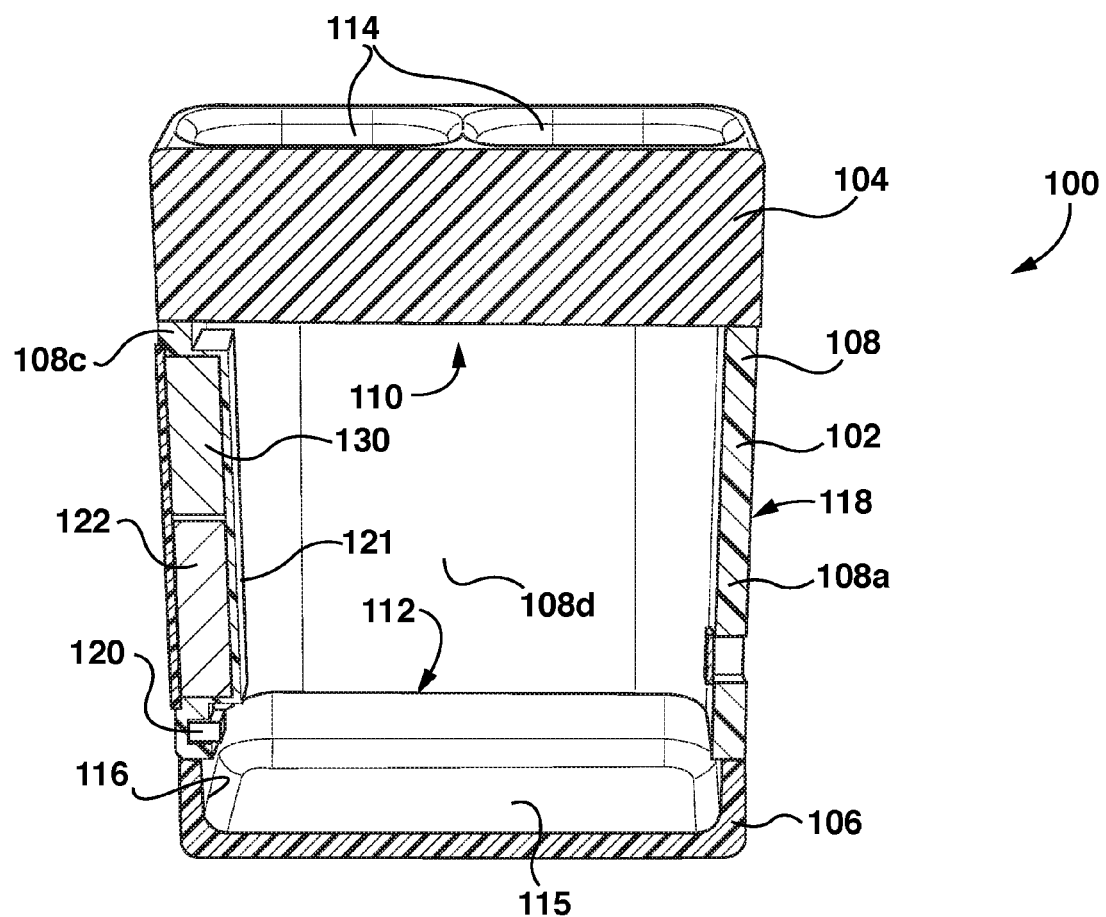
FIG. 3 is a cross-section taken along line 3-3 in FIG. 2, with the toothbrush holder in an assembled state.
Figure 4:
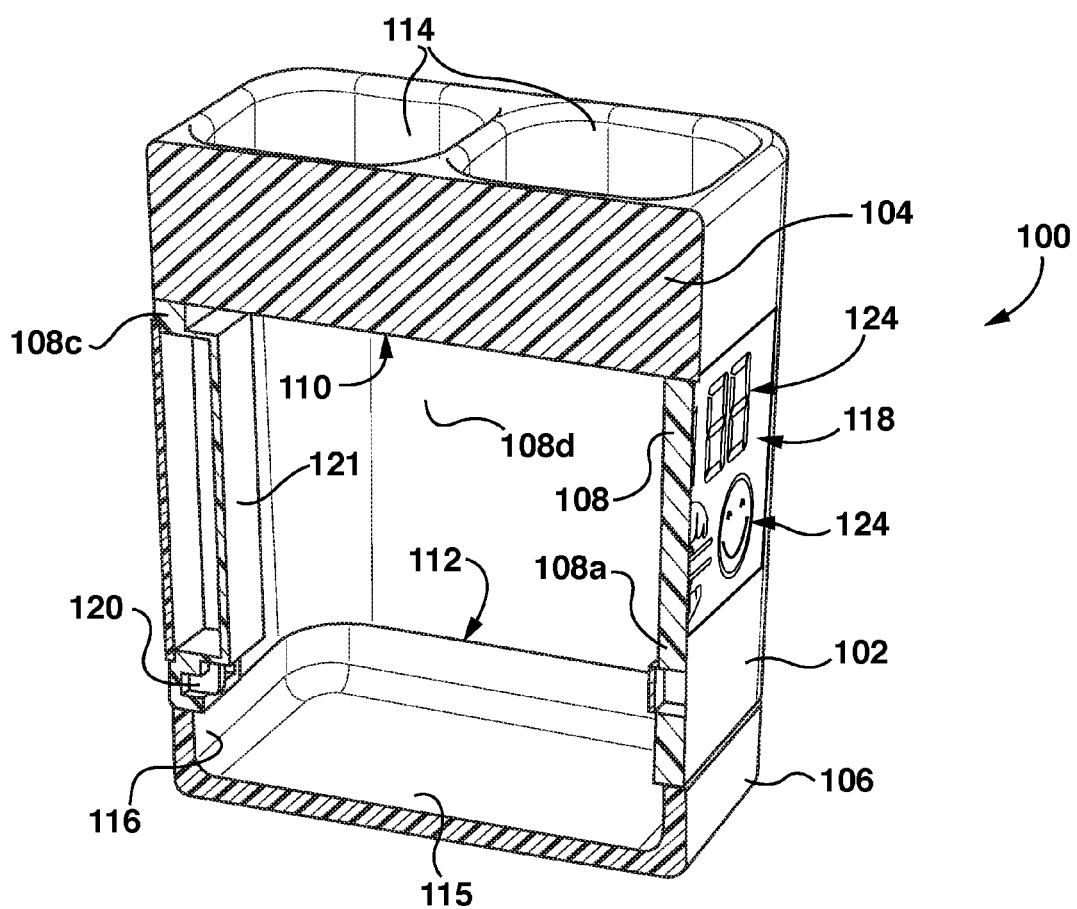
FIG. 4 is a perspective cutaway view of the toothbrush holder of FIG. 1.

Referring to FIGS. 3 and 4, the toothbrush holder 100 is configured to measure the approximate duration of tooth brushing, to aid a user in determining if the teeth have been brushed for a desired amount of time. Specifically, in the example shown, the toothbrush holder 100 includes a display 118 that may indicate to a user any of the following example information: (i) the approximate length of time for which they have been brushing their teeth; (ii) for how much approximate additional time they should brush their teeth; (iii) approximately when they should stop brushing their teeth; and/or (iv) approximately when they should move their toothbrush from one section of the mouth to another section of the mouth. In the example shown, the display 118 is triggered automatically upon removal of a toothbrush from the toothbrush holder 100. Specifically, the main body includes a toothbrush removal sensor 120 (also referred to as sensor 120) positioned to detect removal of a toothbrush from the toothbrush holder 100 and issuing a removal signal in response to the removal of the toothbrush; a timer 122 initiating a time count when the removal signal is issued by the toothbrush removal sensor 120; and the display 118, which is provided on the main body 102 and displays an indicia 124 of the time count.

Referring still to FIGS. 3 and 4, in the example shown, the toothbrush removal sensor 120 is provided on an interior surface of the sidewall 108, and is housed in a compartment 121 formed integrally with the sidewall 108. As stated above, the toothbrush removal sensor 120 detects removal of the toothbrush from the toothbrush holder 100, and issues a removal signal in response to the removal of the toothbrush. The toothbrush removal sensor 120 may include, for example, a pressure sensor, a motion sensor, a reed switch and/or an RFID sensor. Alternatively or additionally, the toothbrush removal sensor 120 may include a mechanical switch.

The toothbrush removal sensor 120 may be configured to detect removal of only one of the toothbrushes that may be received in the main body 102, or may be configured to detect removal of any of the toothbrushes that may be received in the main body 102. Alternatively, a plurality of toothbrush removal sensors may be provided, and each sensor may be configured to detect removal of one of the toothbrushes.

The toothbrush removal sensor 120 is connected to the timer 122. As stated above, the timer 122 initiates a time count when the removal signal is issued by the toothbrush removal sensor 120.

In some examples, the timer 122 is provided with a preset time, or a plurality of preset times. For example, the timer 122 may be a microprocessor, which may be programmed with one or more preset times. The timer 122 may be configured send a command to the display 118 or take another action when one of the preset times is reached. For example, the timer 122 may issue an audio signal when one of the preset times is reached. Alternatively, the timer 122 may send a command to the display 118 to display an indicia of the time count when one of the preset times is reached, as will be described in further detail below. In other examples, the timer 122 may not be provided with a plurality of preset times. For example, the timer may simply initiate the time count, and may continue the time count until the toothbrush is replaced in the holder 100. In such examples, the display may simply display a continuous time readout corresponding to the time count.

In examples wherein the toothbrush holder 100 is configured to hold more than one toothbrush, the timer 122 can be configured to initiate a time count when only one of the toothbrushes is removed from the toothbrush holder 100. Alternatively, the timer can be configured to re-initiate the time count each time a toothbrush is removed from the toothbrush holder. Alternatively, as stated above, a plurality of sensors may be provided, and a plurality of timers may be provided (one for each sensor). Each timer may initiate a time count when one of the toothbrushes is removed from the holder 100.

As stated above, the display 118 displays an indicia 124 of the time count, for example upon commencement of the time count. The display may be, for example, a liquid crystal display (LCD), a light emitting diode (LED) display, or a vacuum fluorescent display (VFD).

As stated above, in some examples, the indicia 124 may be a time readout corresponding to the time count. For example, the display 118 may display the number of seconds elapsed since a toothbrush was removed from the toothbrush holder 100.

In other examples, as shown in FIGS. 1 and 2, the indicia 124 may be a countdown time readout 125. For example, the timer 122 may be programmed with a preset start time, such as of 2 minutes, and upon removal of the toothbrush from the toothbrush holder 100, the display 118 may display a numeric countdown from 2 minutes.

In other examples, the indicia 124 may comprise an icon or a plurality of icons, and an illumination level of the icon(s) may be changed when the time count reaches a preset time. For example, the timer 122 may be programmed with a preset time, and when the time count reaches the preset time, a particular icon may be lit. In one particular example, the timer may be pre-programmed with a preset time, such as a time of 2 minutes, and when the time count reaches two minutes, a happy-face icon 126 may be lit, as shown in FIGS. 1 and 2, to indicate to the user that the teeth have been brushed for a suitable amount of time. In an alternative example, a particular icon may be darkened rather than lit when the preset time is reached In another example, the indicia may comprise an image of a mouth having four quadrants 128a-d, as shown in FIGS. 1 and 2. The timer 122 may be programmed with four different preset times, and the level of illumination of one of the four quadrants 128a-d may be changed when the time count reaches each of the preset times, to indicate to the user that a particular quadrant of the mouth has been brushed for a suitable amount of time, and the user may begin brushing a different quadrant of the mouth. For example, the timer 122 may be programmed with preset times of 30 seconds, 60 seconds, 90 seconds, and 120 seconds. Quadrant 128a may be lit when the time count reaches 30 seconds, quadrant 128b may be lit when the time count reaches 60 seconds, quadrant 128c may be lit when the time count reaches 90 seconds, and quadrant 128d may be lit when the time count reaches 120 seconds. In addition, an audio signal may be issued at each of the preset times.

In the above examples, a preset time of 2 minutes has been used. This time is but one example of a preset time, and various other preset times could be used.

Referring still to FIG. 3, in the example shown, a battery 130 is provided in the main body 102 for powering the timer 122, the display 118, and optionally the sensor 120. The battery 130 is housed in compartment 121.

While the above description provides examples of one or more processes or apparatuses, it will be appreciated that other processes or apparatuses may be within the scope of the accompanying claims.

The invention claimed is:

1. A toothbrush holder comprising:
a) a main body having a toothbrush removal sensor positioned to detect removal of the toothbrush from the toothbrush holder and issuing a removal signal in response to the removal of the toothbrush, a timer initiating a time count when the removal signal is issued by the toothbrush removal sensor; and a display provided on the main body and displaying an indicia of the time count upon the commencement of the time count;
b) a top section having at least one aperture that removably receives a toothbrush handle, the top section removably mounted to the main body; and,
c) a bottom section comprising a drip tray and removably mounted to the main body.

2. The toothbrush holder of claim 1, wherein the indicia comprises a time readout.

3. The toothbrush holder of claim 1, wherein the indicia comprises a countdown time readout.

4. The toothbrush holder of claim 1, wherein the timer is provided with a plurality of preset times and the indicia comprises a plurality of icons and an illumination level of at least one of the icons is changed when the time count reaches each of the preset times.

5. The toothbrush holder of claim 1, wherein the timer is provided with at least four different preset times and the indicia comprises an image of a mouth having four quadrants, and a level of illumination of one of the four quadrants is changed when the time count reaches each of the preset times.

6. The toothbrush holder of claim 5, wherein an audio signal is issued at each of the preset times.

7. The toothbrush holder of claim 1, wherein the timer is provided with a plurality of preset times and an audio signal is issued at each of the preset times.

8. The toothbrush holder of claim 1, wherein the toothbrush removal sensor comprises a mechanical switch.

9. The toothbrush holder of claim 1, wherein the toothbrush removal sensor comprises at least one of a pressure sensor, a motion sensor, a reed switch and an RFID sensor.

* * * * *